(12) United States Patent
Desrosiers

(10) Patent No.: US 12,550,863 B2
(45) Date of Patent: Feb. 17, 2026

(54) APPARATUS FOR A LITTER CONTAINER WITH INTEGRATED NESTED DISPOSAL BAGS

(71) Applicant: Box Holdco, LLC, New York, NY (US)

(72) Inventor: Christian Desrosiers, New York, NY (US)

(73) Assignee: Box Holdco, LLC, New York, NY (US)

(*) Notice: Subject to any disclaimer, the term of this patent is extended or adjusted under 35 U.S.C. 154(b) by 0 days.

(21) Appl. No.: 18/797,754

(22) Filed: Aug. 8, 2024

(65) Prior Publication Data

US 2026/0041056 A1    Feb. 12, 2026

(51) Int. Cl.
*A01K 1/01* (2006.01)

(52) U.S. Cl.
CPC .................. *A01K 1/0125* (2013.01)

(58) Field of Classification Search
CPC .................................................. A01K 1/0125
See application file for complete search history.

(56) References Cited

U.S. PATENT DOCUMENTS

| | | | |
|---|---|---|---|
| 2,092,969 A | 9/1937 | Gustafson | |
| 2,324,440 A | 7/1943 | Tormohlen | |
| 3,960,062 A * | 6/1976 | Leloux | B65D 33/002 206/390 |
| 4,402,452 A | 9/1983 | Kupersmit | |
| 4,859,082 A * | 8/1989 | Llorens | B65D 33/065 383/77 |
| 4,978,231 A | 12/1990 | Ling | |
| 5,078,099 A * | 1/1992 | Balson | A01K 1/0125 229/125 |
| 5,207,772 A * | 5/1993 | Lauretta | A01K 1/0114 119/167 |
| 5,292,093 A | 3/1994 | Shumake | |
| 5,363,980 A | 11/1994 | Mulcahy | |
| 5,425,468 A | 6/1995 | Birkel | |
| 5,709,171 A * | 1/1998 | Moore, III | A01K 1/0125 119/167 |
| 5,832,869 A * | 11/1998 | Franczak | A01K 1/0107 119/168 |
| 5,897,084 A | 4/1999 | Judge | |
| 5,983,832 A * | 11/1999 | Seo | A01K 1/0114 119/167 |
| 6,595,159 B1 * | 7/2003 | Montalbano | A01K 1/0114 119/167 |
| 6,808,073 B2 | 10/2004 | Cuisinier | |
| 7,080,750 B2 | 7/2006 | Wein | |
| 7,168,591 B1 | 1/2007 | Miller | |

(Continued)

*Primary Examiner* — Christopher D Hutchens
(74) *Attorney, Agent, or Firm* — ROCKMAN VIDEBECK & O'CONNOR LLC; Howard B. Rockman; Mercedes V. O'Connor

(57) ABSTRACT

A litter box with disposal bags and a collapsible container. The collapsible container has a base, a set of walls, and an entrance. A set of nested bags is attached to the container. The set of nested bags has a first bag followed by a plurality of bags. A first connector strip secures the set of nested bags to the walls circumferentially and includes a pull tab allowing the first connector strip to be easily removed. A second connector strip connects the set of bags to the base. A quantity of litter is lodged in the set of bags.

8 Claims, 2 Drawing Sheets

(56) References Cited

U.S. PATENT DOCUMENTS

| | | | |
|---|---|---|---|
| 7,811,522 B2 | 10/2010 | Mathus | |
| 8,182,564 B2 | 5/2012 | Howard | |
| 8,342,461 B2 | 1/2013 | Sutphen | |
| 8,807,379 B1 | 8/2014 | Hammond | |
| 8,887,941 B2 | 11/2014 | Heintzman | |
| 8,978,588 B2 * | 3/2015 | Simon | A01K 1/0107 119/168 |
| 10,206,370 B2 * | 2/2019 | Huang | A01K 1/0114 |
| 11,844,327 B2 * | 12/2023 | Kaminski | A01K 1/0114 |
| 11,958,683 B1 | 4/2024 | Desrosiers | |
| 2002/0121455 A1 | 9/2002 | Smith | |
| 2002/0190069 A1 * | 12/2002 | Cuisinier | B65D 33/001 220/495.11 |
| 2003/0089719 A1 | 5/2003 | Berger | |
| 2004/0223664 A1 | 11/2004 | Martin | |
| 2005/0129335 A1 | 6/2005 | Paul | |
| 2006/0266752 A1 | 11/2006 | Scherer | |
| 2007/0045326 A1 | 3/2007 | Tramontina | |
| 2007/0227924 A1 | 10/2007 | Ou | |
| 2007/0235455 A1 | 10/2007 | Goldberg | |
| 2007/0235456 A1 | 10/2007 | Tamez | |
| 2007/0257093 A1 | 11/2007 | Lott | |
| 2008/0041316 A1 * | 2/2008 | Hartzell | A01K 1/0114 206/499 |
| 2012/0255497 A1 * | 10/2012 | Simon | A01K 1/0152 206/427 |
| 2012/0291258 A1 | 11/2012 | Dominick | |
| 2013/0186900 A1 | 7/2013 | Heintzman | |
| 2014/0238993 A1 | 8/2014 | Andersen | |
| 2014/0263532 A1 | 9/2014 | Licata | |
| 2017/0088349 A1 | 3/2017 | Patel | |
| 2023/0078871 A1 * | 3/2023 | Kaminski | A01K 1/0114 119/167 |

* cited by examiner

APPARATUS FOR A LITTER CONTAINER WITH INTEGRATED NESTED DISPOSAL BAGS

FIELD OF INVENTION

A litter container with integrated nested disposal bags.

Problem to be Solved

Often, one of the most difficult parts of owning and caring for a cat is the necessity of a litter box. Litter boxes typically require the scooping and changing of the cat litter in order to prevent smell and promote cleanliness. This can be strenuous for the cat owner. Further, this action of replacing the cat litter can create a secondary mess if the soiled litter spills out of the litter box upon replacing it, leaving a collection of litter outside the litter box to be swept up. Once this secondary mess is cleaned up by the cat owner, they must then redistribute the cat litter into the litter box. This is not to mention that the litter box itself will often require routine cleaning and maintenance. There are more modern examples of litter boxes that seek to solve these problems. Some modern litter boxes are automated. An automated example of a cat litter box may automatically collect and remove the soiled litter. Some of these examples even have the ability to clean themselves. However, these examples of litter boxes can be exceptionally expensive compared to traditional litter boxes, and they can be overly complicated.

Therefore, it would be advantageous for a litter box to provide an easy way to remove and replace cat litter when necessary. Further, it would be advantageous for this litter box to be less expensive than current automated or robotic ones on the market. In some embodiments, it would also be favorable that this new litter box be constructed from environmentally friendly materials.

DESCRIPTION OF PRIOR ART

All prior art references are in reference to applicant's issued U.S. Pat. No. 11,958,683 B1 ("Patent '683"), which the presently described invention intends to improve upon. Patent '683 is an invention for a collapsible container system that includes nested bags with a first and second connector ribbon. The first connector ribbon connects the bag to the rim of the container, and the second ribbon connects the nested bags to the vertical portion of the container's wall. However, this design cannot operate as a litter box as can the presently described invention. All other prior art relates to a waste container or bag system that is not suitable for the purposes of this presently described invention. Rather, the present improvements to Patent '683 and additions seek to solve an issue outside what is presented by the prior art.

Objective of the Invention

The present invention intends to provide a new litter box or litter container comprising a collapsible container with nested integrated disposal bags. The present invention will allow a user to remove the soiled cat litter easily and quickly while preventing any secondary clean-up. Further, the invention, in some embodiments, will not require the cat litter to be replaced by the owner. The collapsible container of the litter box itself may be disposable and environmentally friendly. Also, the litter box of the presently described invention will be less costly and complicated than current automated litter box systems. Collectively, these are all problems that cannot be solved by current litter boxes.

SUMMARY OF THE INVENTION

In one embodiment, the collapsible container comprises a set of nested bags predisposed within the litter box. Each bag of the set of nested bags contains cat or animal litter pre-placed and secured within the bag. The nested set of bags are layered one on top of each other, secured about the base and sides of the collapsible container via the first and second connector strips. The first and second connector strips may be configured with perforations to aid in removal. Other embodiments may secure the set of nested bags to the entrance of the collapsible container via the first connector strip. The set of nested bags of the collapsible container are easily removable using a mechanical pull tab disposed on the first connector strips. The first bag, or the most outward bag, of the set of nested bags, is fitted with a seal to prevent the litter from leaving the bag and the collapsible container of the litter box during transportation. In some embodiments, the bags of the nested set of bags, or the litter itself, may have odor-dispersing capabilities or a fragrance component. The collapsible container expands from a first flat configuration to a second open configuration to create a box-like shape. The set of nested bags and the collapsible container may be comprised of environmentally friendly materials. In some embodiments, the litter box may have a lid or roof to enclose the collapsible container and nested bags.

DETAILED DESCRIPTION

Figure 1:
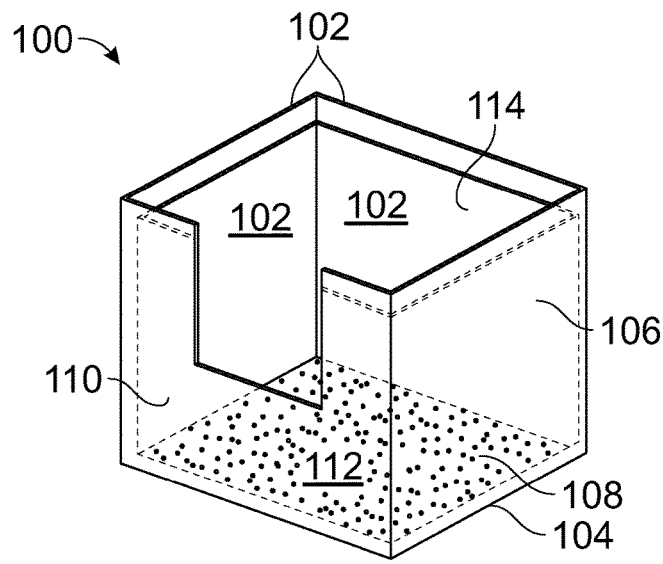
FIG. 1 is a perspective view of the collapsible container comprising the litter box and set of nested bags.

FIG. 1 is a perspective view of the litter box with the container 100. The container 100 is comprised of a set of walls 102 and a base 104. Within the container 100, a set of nested bags 106 are secured to the set of walls 102 and the base 104. The set of nested bags 106 may have a seal layer 108 covering the topmost bag 114 of the set of nested bags 106 to prevent the litter from escaping the container 100. The seal layer 108 circumferentially connects to the topmost bag 114. At least one of the walls 102 has an entrance 110, wherein the set of nested bags 106 does not block the entrance 110. The set of walls 102, the base 104, and the entrance 110 defining the cavity of the container 100. In an embodiment, the topmost bag 114 of each nested bag 106 would be attached to container 100 at a level not exceeding the lower level of entrance 110. The set of nested bags 106 is shown holding a quantity of litter 112. The top most bag 114 of the set of nested bags 106 attaches to the seal 108, securing the quantity of litter 112 within the first bag 114.

Figure 2:
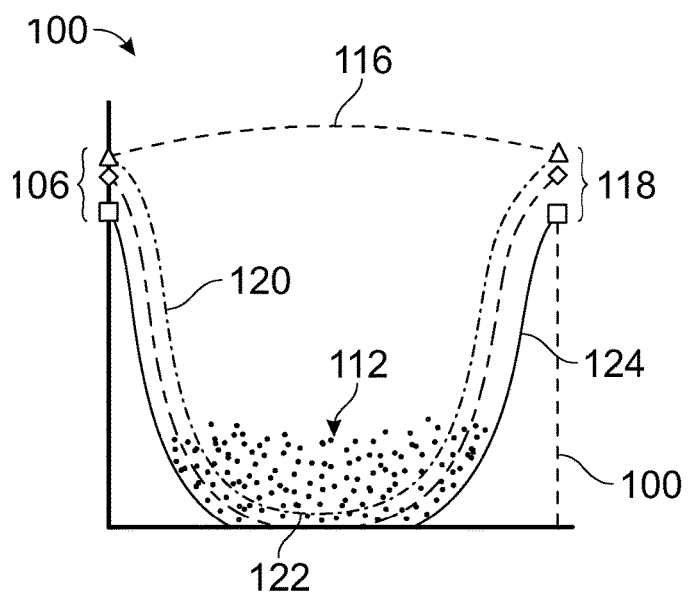
FIG. 2 is a cross-section view of the collapsible container of the litter box and set of nested bags of FIG. 1.

FIG. 2 is a cross-section of the cat litter box of FIG. 1 with the container 100 and its contents cut in half vertically. The nested set of bags 106 can be seen attached to the set of walls via a first connector strip 116 adhesively attached to the upper portion of the walls, except where the entrance 110 is located. The first connector strip 116 has a pull tab 118 that assists in removing the connector strip from the set of nested bags 106 and from the set of walls 102. A quantity of litter 112 can be seen within each layer of the plurality of bags 120 that comprises the set of nested bags 108. A second connector 122 adhesively connects the set of bags 106 to each other and the last bag 124 of the set of nested bags 106 to the base 104.

Figure 3:
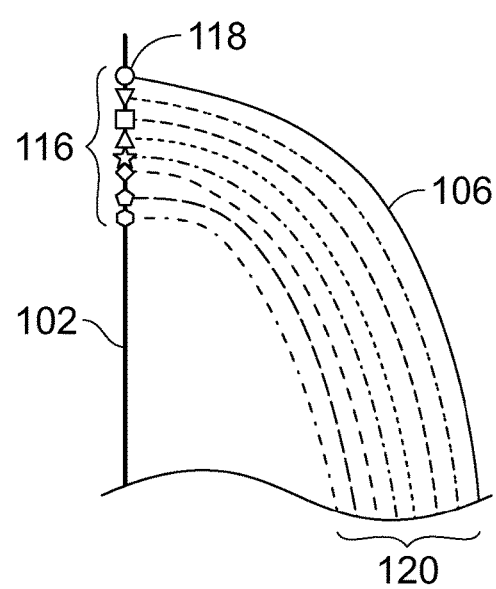
FIG. 3 is a detailed view of the set of nested bags secured to a wall of the container of FIGS. 1 and 2.

FIG. 3 is a detailed view of the set of nested bags 106, depicting the plurality of bags 120 of the nested set of bags 106 stacked upon each other at the upper end of each bag. The set of nested bags 106 are connected to the set of walls 102 via the first connector strip 116 with each one having a pull tab 118.

Figure 4:
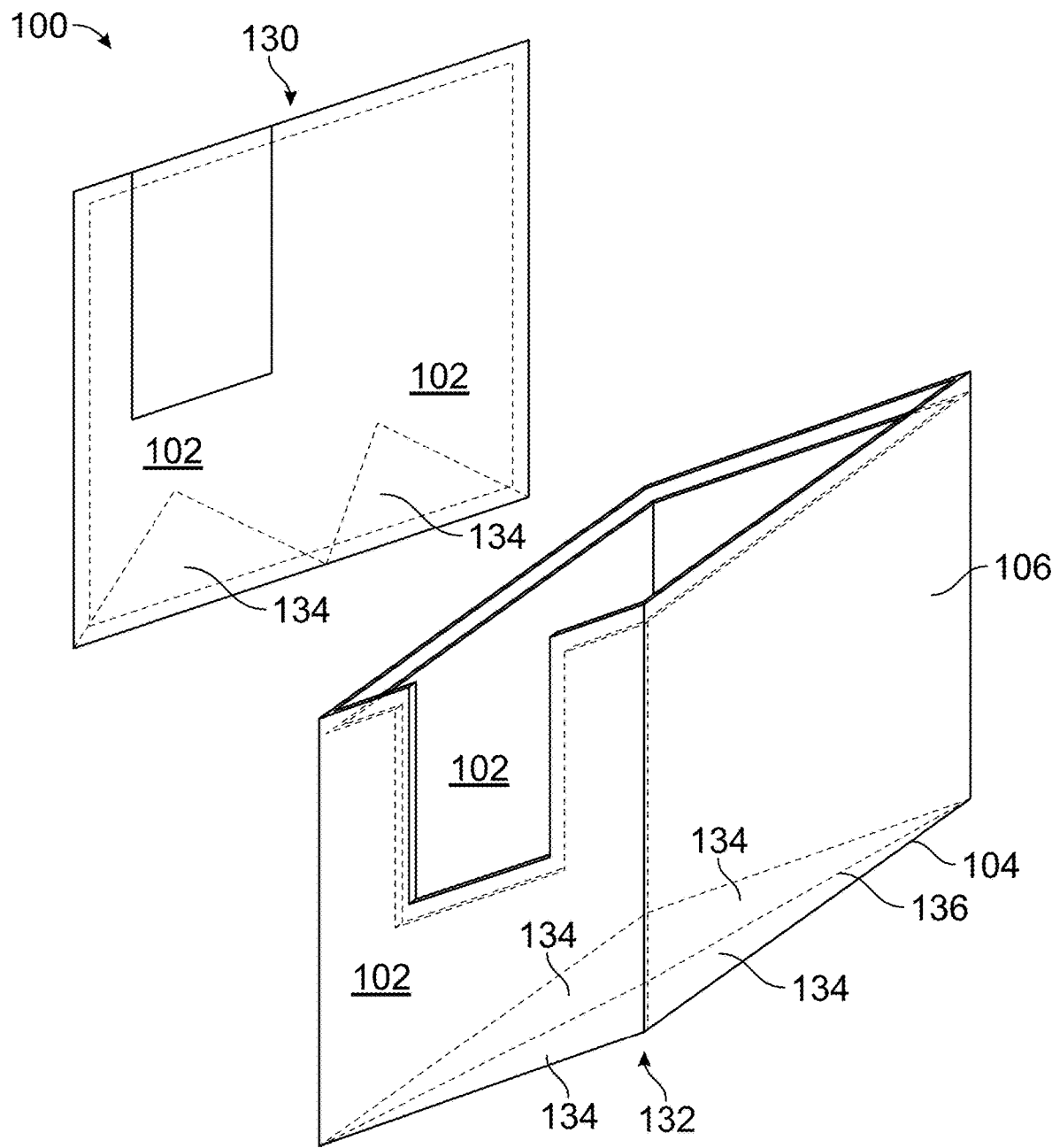
FIG. 4 is a schematic illustration of the collapsible container expanding from a flat configuration to an open configuration.

FIG. 4 is a schematic illustration of the container 100 folding from its first flat configuration 130 to its second open configuration 132. A set of base flaps 134 that fold from a horizontal position to a lateral position creates a set of joints 136. The set of flaps 134 and the set of joints 136 in tandem form the base 104 of the container 100 when the container 100 is in the second open configuration 132. The set of nested bags 106 are included within this figure as they may come pre-attached to the container 100 at the set of walls 106.

While the present disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A litter container with integrated nested disposal bags comprising;
    a collapsible container having a base, the base attached to a set of walls, at least one wall of the set of walls having an entrance providing an opening in the at least one wall,
    the base, set of walls, and entrance defining a cavity,
    a set of nested bags within the cavity, the set of nested bags having a first bag, the first bag being at the outermost position of the set of nested bags,
    the set of nested bags comprising a plurality of bags,
    a first and second connector strip,
    the first connector strip securing the set of nested bags onto the set of walls at a level not exceeding a lower level of the entrance,
    the first connector strip circumferentially connecting the set of nested bags to the set of walls,
    the first connector strip having a pull tab, the pull tab allowing the first connector strip to be mechanically removed;
    a second connector strip securing the set of nested bags to the base of the collapsible container;
    a quantity of litter disposed between each bag of the set of bags, the quantity of litter sufficiently located at a bottom portion of each bag of the set of nested bags.

2. The litter box of claim 1, wherein the first bag has a seal, the seal connected to the first bag circumferentially.

3. The litter box of claim 1, wherein the set of nested bags has a fragrance.

4. The litter box of claim 1, wherein the collapsible container has four walls.

5. The litter box of claim 1, wherein the base of the collapsible container has a set of panels, the set of panels forming a set of connections, the set of panels and connections forming the base.

6. The litter box of claim 1, wherein the first and the second connector strips include perforations.

7. The litter box of claim 1, wherein the collapsible container has a lid.

8. The litter box of claim 1, wherein the collapsible container has a first flat configuration that can transition into a second open configuration.

* * * * *